United States Patent
Amortegui et al.

(10) Patent No.: US 8,439,140 B1
(45) Date of Patent: May 14, 2013

(54) ENERGY CONVERTER ASSEMBLY

(76) Inventors: Carlos Amortegui, Opa Locka, FL (US); Juan Carlos Amortegui, Pembroke Pines, FL (US)

( * ) Notice: Subject to any disclaimer, the term of this patent is extended or adjusted under 35 U.S.C. 154(b) by 64 days.

(21) Appl. No.: 12/873,848

(22) Filed: Sep. 1, 2010

(51) Int. Cl.
*B60K 7/00* (2006.01)

(52) U.S. Cl.
USPC ...................................................... 180/65.51

(58) Field of Classification Search ...... 180/65.1–65.29, 180/65.51
See application file for complete search history.

(56) References Cited

U.S. PATENT DOCUMENTS

| | | | |
|---|---|---|---|
| 2,306,042 A * | 12/1942 | Custer ......................... | 180/214 |
| 3,190,387 A * | 6/1965 | Dow ............................ | 180/65.1 |
| 3,424,261 A * | 1/1969 | Sheldon ....................... | 180/69.6 |
| 3,915,251 A * | 10/1975 | Kassekert et al. ............ | 180/65.1 |
| 4,153,128 A * | 5/1979 | Heitmeyer et al. .......... | 180/65.7 |
| 4,191,505 A | 3/1980 | Kaufman | |
| 4,278,896 A | 7/1981 | McFarland | |
| 4,291,235 A | 9/1981 | Bergey, Jr. et al. | |
| 4,311,918 A | 1/1982 | Vaseen | |
| 4,802,542 A * | 2/1989 | Houston et al. ............. | 180/65.51 |
| 5,009,569 A | 4/1991 | Hector, Sr. et al. | |
| 5,215,156 A | 6/1993 | Stulbach et al. | |
| 5,680,908 A | 10/1997 | Reed | |
| 5,921,334 A | 7/1999 | Al-Dokhi | |
| 5,921,338 A * | 7/1999 | Edmondson ................ | 180/65.51 |
| 6,069,409 A | 5/2000 | Fowler et al. | |
| 6,082,476 A | 7/2000 | Stulbach | |
| 6,179,078 B1 * | 1/2001 | Belloso ....................... | 180/69.6 |
| 6,220,381 B1 | 4/2001 | Damron et al. | |
| 6,343,667 B2 * | 2/2002 | Sauve ......................... | 180/228 |
| 6,712,167 B2 * | 3/2004 | Gu .............................. | 180/206.5 |
| 6,734,645 B2 | 5/2004 | Auerbach | |
| 6,752,229 B2 * | 6/2004 | Ho .............................. | 180/181 |
| 6,828,691 B2 | 12/2004 | Tu et al. | |
| 7,017,685 B2 * | 3/2006 | Schoenberg ................ | 180/2.1 |
| 7,108,089 B2 * | 9/2006 | Hanafusa et al. ........ | 180/65.245 |
| 7,128,671 B2 * | 10/2006 | Gu et al. ..................... | 474/23 |
| 7,215,037 B2 | 5/2007 | Scalzi | |
| 7,261,171 B2 * | 8/2007 | de la Torre et al. ........ | 180/65.31 |
| 7,267,190 B2 * | 9/2007 | Hirano ........................ | 180/65.1 |
| 7,314,109 B2 * | 1/2008 | Holland ...................... | 180/206.7 |
| 7,461,714 B2 * | 12/2008 | Holland ...................... | 180/206.7 |
| 7,591,335 B2 * | 9/2009 | Howell et al. .............. | 180/197 |
| 7,646,106 B2 | 1/2010 | Thompson | |
| 7,982,323 B2 * | 7/2011 | Seghezzi .................... | 290/1 C |
| 7,990,085 B2 * | 8/2011 | Furukawa et al. .......... | 318/142 |
| 2001/0035308 A1 * | 11/2001 | Sauve ......................... | 180/228 |
| 2002/0079146 A1 * | 6/2002 | Chen .......................... | 180/65.1 |
| 2002/0117343 A1 * | 8/2002 | Kao ............................ | 180/220 |

(Continued)

*Primary Examiner* — Jeffrey J Restifo
*Assistant Examiner* — Erez Gurari
(74) *Attorney, Agent, or Firm* — Malloy & Malloy, P.L.

(57) ABSTRACT

An assembly structured to convert mechanical energy to electrical energy for a wheeled vehicle such as an automobile. A current generating assembly is mounted on the vehicle and an adaptor is connected between and in engaging relation with a vehicle wheel and a tire/rim assembly connected to the vehicle wheel. The adaptor includes a drive portion disposed in an accessible, partially exposed orientation relative to the vehicle wheel. A drive linkage, such as a drive belt, is disposed in driven relation to the drive portion of the adaptor and in driving relation to the current generating assembly. Rotation of the wheel during normal operation of the vehicle results in driving or powering of the current generating assembly and the generation of current to an electronic drive assembly of the vehicle and/or electrically powered components thereof, at least partially through the battery assembly associated with the vehicle.

21 Claims, 6 Drawing Sheets

U.S. PATENT DOCUMENTS

| | | | |
|---|---|---|---|
| 2002/0134604 A1* | 9/2002 | Lan | 180/219 |
| 2004/0016582 A1* | 1/2004 | Ho | 180/181 |
| 2005/0133282 A1* | 6/2005 | Huang et al. | 180/65.1 |
| 2006/0144624 A1* | 7/2006 | Clark et al. | 180/65.1 |
| 2006/0225931 A1* | 10/2006 | Kurata | 180/65.5 |
| 2009/0218150 A1* | 9/2009 | Heimbrock et al. | 180/65.51 |
| 2010/0071983 A1* | 3/2010 | Holland | 180/215 |
| 2010/0230192 A1* | 9/2010 | Riley | 180/65.25 |
| 2012/0052995 A1* | 3/2012 | Scarbo et al. | 474/86 |

* cited by examiner

ENERGY CONVERTER ASSEMBLY

BACKGROUND OF THE INVENTION

1. Field of the Invention

This invention relates to an assembly structured to convert mechanical energy to electrical energy on a wheeled vehicle such as an automobile, truck, etc. An adaptor is structured for engagement with an interconnection between a wheel of the vehicle and a tire assembly connected thereto such that the adaptor rotates with the wheel and connected tire assembly. Mechanical linkage is connected in driven relation to the adaptor, and in driving relation to a current generating assembly, for powering of predetermined electrical components of the vehicle.

2. Description of the Related Art

There is a long-recognized concern for the environment relating to the availability of conventional fossil fuels, as well as a variety of other problems associated with vehicles which are powered by an internal combustion (IC) engine. As such, conventional IC engines typically operate on gasoline, diesel, natural gas, and a variety of other fossil fuels. The increased concern of pollution throughout the world and a dwindling of fossil fuel supply has resulted in various attempts to modify the compositions of usable fuels as well as the drive or power systems associated with wheeled road vehicles.

By way of example, available gasoline fuel compositions now include various additives which attempt to render an efficient operation of the IC engine while lessening the dependence on gasoline, diesel, or other fuel supplies. Currently, there are at least two popular alternatives presently available which represent alternatives to the petroleum based fuel IC engine. One includes a vehicle driven exclusively by electric power. One possible disadvantage with known or commercially available engines of this type is the frequent charging requirements which must be accomplished by domestic or commercial charging stations. Such purely electrically powered vehicles suffer from the additional disadvantage of having an extremely short and non-practical range of travel of less than a hundred miles before requiring recharging.

Other known alternatives used to power road capable vehicles include hybrid vehicles which run partly on electrical power and partly on an IC engine using the aforementioned petroleum based fuel. However, because of the short operative range of the electrical power source associated with such hybrid vehicles, the IC engine is, in fact, used extensively. As a result, the environment, worldwide fuel supplies and the like are not significantly benefited.

Accordingly, there is a need in the automotive or other vehicle industry, specifically in the area of power generation and/or modified drive trains, to extend the operable driving distance of vehicles driven exclusively or partially by electric power, including hybrid vehicles utilizing an electrical converter assembly. Such a preferred and proposed electrical convertor assembly should utilize the basic energy provided by the continuous rotation of a non-drive train wheel of the vehicle in a manner which provides supplementary current sufficient to maintain adequate and operable charges on the contained battery assembly associated with electric or hybrid vehicles. Moreover, such a preferred and proposed energy converter assembly should be capable of converting the wasted mechanical energy, due to the rotation of the non-drive train wheels of the vehicle, into sufficient auxiliary current capable of not only maintaining a charge on the battery supply associated with such vehicles, but also to independently or appropriately power auxiliary electronic components of the vehicle and/or those typically used with the vehicle, such as personal electronic devices.

Finally, such a preferred and proposed energy convertor assembly should be simple in design and operation, however, still be reliable over an extended period of time and have an overall structure capable of being readily adapted to currently existing, commercially available road vehicles without significant structural modification thereof.

SUMMARY OF THE INVENTION

The present invention is directed to an energy converter assembly structured to convert mechanical energy to electrical energy during the operation and/or travel of a wheeled vehicle. As practically applied, the wheeled vehicle may be an automobile, truck, or the like. In one or more preferred embodiments, the energy converter assembly of the present invention is specifically adapted to be used in combination with a vehicle having an electric drive train or assembly, and primarily, or at least partially, powered by a battery pack in cooperation with an electrical current generating assembly. This electrical current generating assembly is mounted on the vehicle in a preferred and appropriate location, and may assume a variety of different known or customized structures such as, but not limited to, a vehicle or automobile alternator or other alternator/generator structure capable of generating an appropriate and sufficient electrical current to operate various electrical components of the vehicle, and possibly the electrical drive assembly associated with a hybrid type vehicle.

More specifically, the energy converter assembly of the present invention comprises an adaptor connected in an operative position between, and in engagement with, a wheel of the vehicle and a tire assembly connected thereto. As used herein, the term "vehicle wheel" is meant to describe, and at least partially include, the wheel drum which is fixedly secured to a corresponding end of the vehicle axle so as to rotate therewith. Further, the vehicle wheel/brake drum is structured to include a plurality of outwardly extending lugs to which the rim of the tire assembly is connected. In typical fashion, the plurality and pattern or position of the plurality of lugs correspond to the receiving openings or apertures formed in the rim of the connected tire assembly. Also as conventionally assembled, an inflatable or other appropriate tire is secured in surrounding relation to the tire rim and supports the vehicle over the road or other supporting surface during the travel thereof.

As a result, the adaptor, when connected in its operative position as set forth above, will rotate with the vehicle wheel and connected tire assembly. The adaptor further includes a drive portion which is disposed exteriorly of the vehicle wheel and connected tire assembly in an exposed location or orientation. This drive portion of the adaptor is cooperatively structured with appropriate mechanical linkage so as to drive or power the current generating assembly during the rotation of the vehicle wheel and tire assembly.

As set forth in greater detail below, cooperative structuring between the adaptor and, in particular, the drive portion thereof, and that of the mechanical drive linkage, will provide an efficient driving force when the drive linkage is connected to the current generating assembly and when the adaptor is in the aforementioned operative position, such as when the vehicle wheel continuously rotates during travel of the vehicle. Such cooperative structuring between the adaptor, the drive linkage, and the current generating assembly facilitates, in at least one preferred embodiment of the energy converter assembly, the drive linkage being in the form of at least one drive belt disposed in driven engagement with the drive portion of the adaptor and in driving engagement with the spindle, axle, etc. of the current generating assembly.

Additional structural and operative features of the energy converter assembly of the present invention include the adaptor having a base and a surrounding side wall which collectively define a hollow interior of the adaptor. The adaptor further includes an access opening oppositely disposed to the base, wherein the access opening and hollow interior of the adaptor are appropriately dimensioned and configured to receive the vehicle wheel/brake drum within the hollow interior such that it is fully, or at least partially, enclosed. Moreover, the base of the adaptor includes an apertured construction comprising a plurality of apertures passing through the base. The plurality of apertures defining the apertured construction of the base are provided in an equal number and corresponding pattern to that of the plurality of lugs secured to the vehicle wheel, and accordingly, of receiving apertures formed in the rim of the connected tire assembly. As a result, when in an assembled state, the lugs of vehicle wheel pass through the plurality of apertures and the base of the adaptor, and further pass into the receiving apertures formed in the rim of the connected wheel assembly. Lug nuts or other appropriate fasteners or connecters are secured to the exposed portions of the lug that at least partially protrude outwardly from the rim of the connected tire assembly, in a conventional manner.

Other structural and operative features of the energy converter assembly of the present invention include the additional structuring of the adaptor to appropriately dimension and dispose the aforementioned drive portion thereof in an exposed orientation sufficient to facilitate a stable and efficient operative interconnection of the mechanical drive linkage or drive belt with the drive portion of the adaptor. Therefore, the drive portion is more specifically defined by a preferably continuous, cylindrical configuration of the exterior surface of at least a portion of the side wall of the adaptor. This portion of the exterior surface could have a sufficient dimension to receive the drive belt and maintain a constant driving engagement therewith, without interference from adjacent components of the vehicle or the connected tire assembly. Moreover, the portion of the exterior surface of the adaptor may be additionally structured or configured to eliminate, or significantly reduce, the possibility of slippage or inadvertent displacement between the drive portion of the adaptor and the belt, such as displacement of the drive belt from the drive portion or exterior surface of the adaptor.

As set forth above, certain preferred embodiments of the energy converter assembly of the present invention incorporate a drive belt or drive belt assembly as the drive linkage that serves to operatively interconnect the adaptor to the current generating assembly. When the drive linkage is defined by such a drive belt assembly, a belt tensioning assembly may be used to maintain proper tension on the drive belt, and as such, assure the drive linkage is always maintained in an effective driving interconnection between the adaptor and the current generating assembly. More specifically, since the adaptor is connected to the drive wheel and axle, and is movable both linearly and rotationally therewith, an irregular road surface may result in linear displacement of the axle and vehicle wheel towards or away from the current generating assembly. This is particularly true when the current generating assembly is mounted on or fixedly secured to the vehicle frame. Therefore, due to the revision of conventional shock absorbers, suspensions springs, etc., the vehicle wheel, axle and tire assembly connected thereto will move relative to the frame, and accordingly, the fixedly secured or mounted current generator assembly. This movement will, in turn, result in a variation of tension of the belt serving to operatively interconnect the adaptor to the current generating assembly. Therefore, a linkage orientation device, preferably in the form of the aforementioned belt tensioning assembly, is operatively connected to the belt. Such a belt tensioning assembly may include a biasing or tension regulating spring housed within an appropriate casing, where the casing may be fixedly secured to the frame in an appropriate location and orientation. Such a belt tensioning assembly also may include at least one outwardly protruding or extending arm having a belt engaging portion connected thereto. As such, the belt engaging portion will be maintained in a continuous engagement with the moving belt, and the aforementioned biasing spring(s) will be reloaded or structured to include a predetermined biasing force serving to maintain an adequate and appropriate tension on the belt, even during relatively severe displacement of the vehicle wheel and connected tire assembly relative to the current generating assembly, such as when the vehicle is traveling over bumps, potholes, etc.

While the energy converter assembly of the present invention is structurally and operatively adaptable to a variety of different vehicles for purposes of powering the electrical components thereof and/or maintaining appropriate charge on the battery facilities associated with the vehicle, at least one preferred embodiment of the present invention comprises operative and structural features which facilitate its adaptation to electrically driven vehicles. In this additional preferred embodiment, the vehicle may include an electrical drive assembly, preferably associated with the front wheels of the vehicle, and further wherein the adaptor is connected in an operative position with one rear wheel of the vehicle, as in the manner described above. Moreover, a control assembly may include appropriate electrical circuitry serving to distribute the current generated by the generator assembly, as well as the current delivered from the battery facilities of this type of vehicle. Accordingly, the current distributing circuitry of the control assembly may take a variety of different forms, structures, and operative features which facilitate maintenance of an appropriate charge on one or more batteries associated with the vehicle battery assembly, as well as the distribution of the current from the battery assembly and or the current generating assembly to the electrical drive assembly associated with the electrically driven vehicle. Such an electrically driven vehicle may be a hybrid type vehicle, driven partially by an IC engine and partially by the aforementioned electrical drive assembly, as is known in the automobile industry.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented in the accompanying drawings, the present invention is directed to an energy converter assembly generally indicated as 10 and comprising an adaptor 12, a current generating assembly 14, and a drive linkage 17 serving to operatively and drivingly interconnect the current generating assembly 14 to the adaptor 12, as will be explained in greater detail hereinafter.

Figure 1:
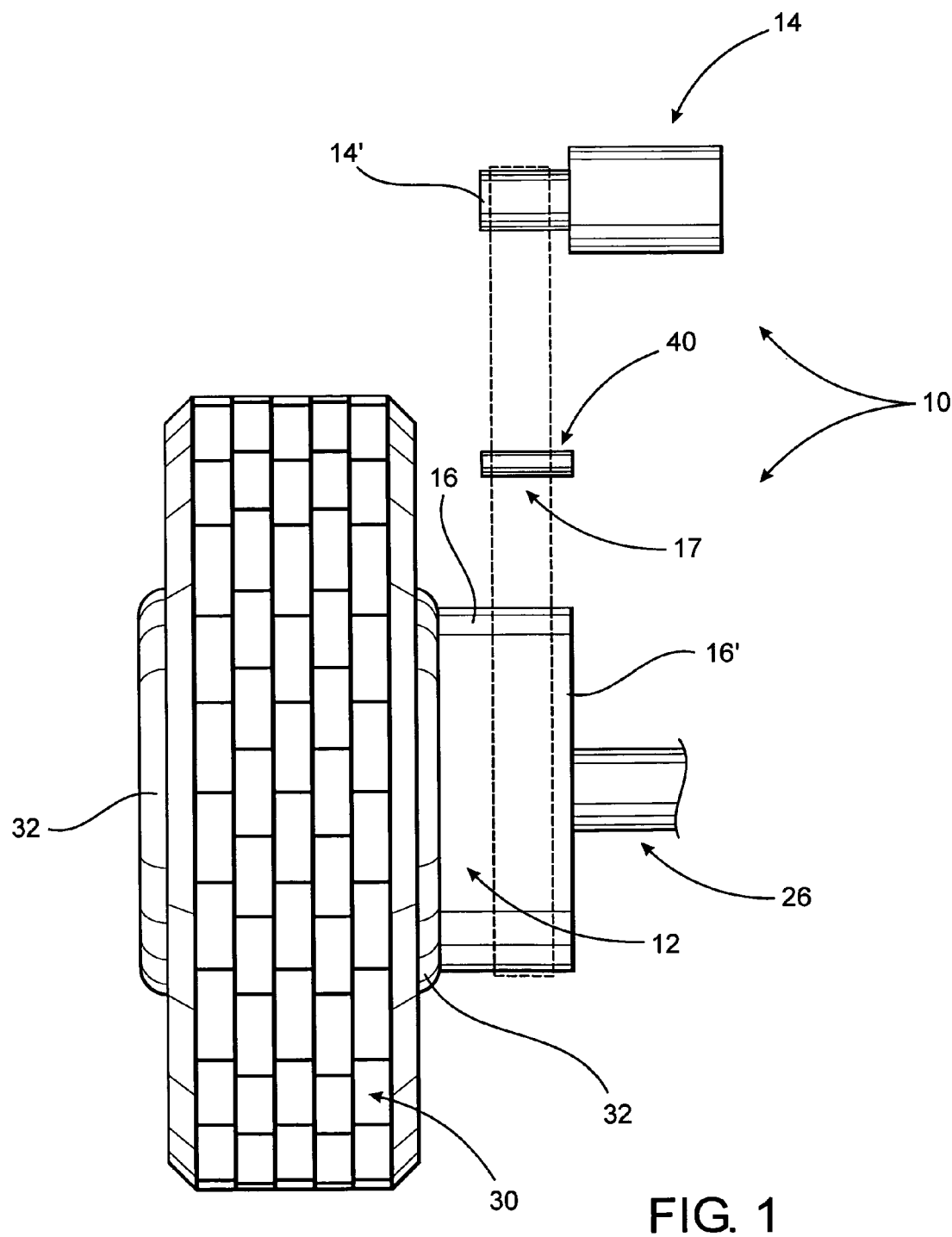
FIG. 1 is an assembled energy converter assembly of the present invention in partial schematic and cutaway.
Figure 2:
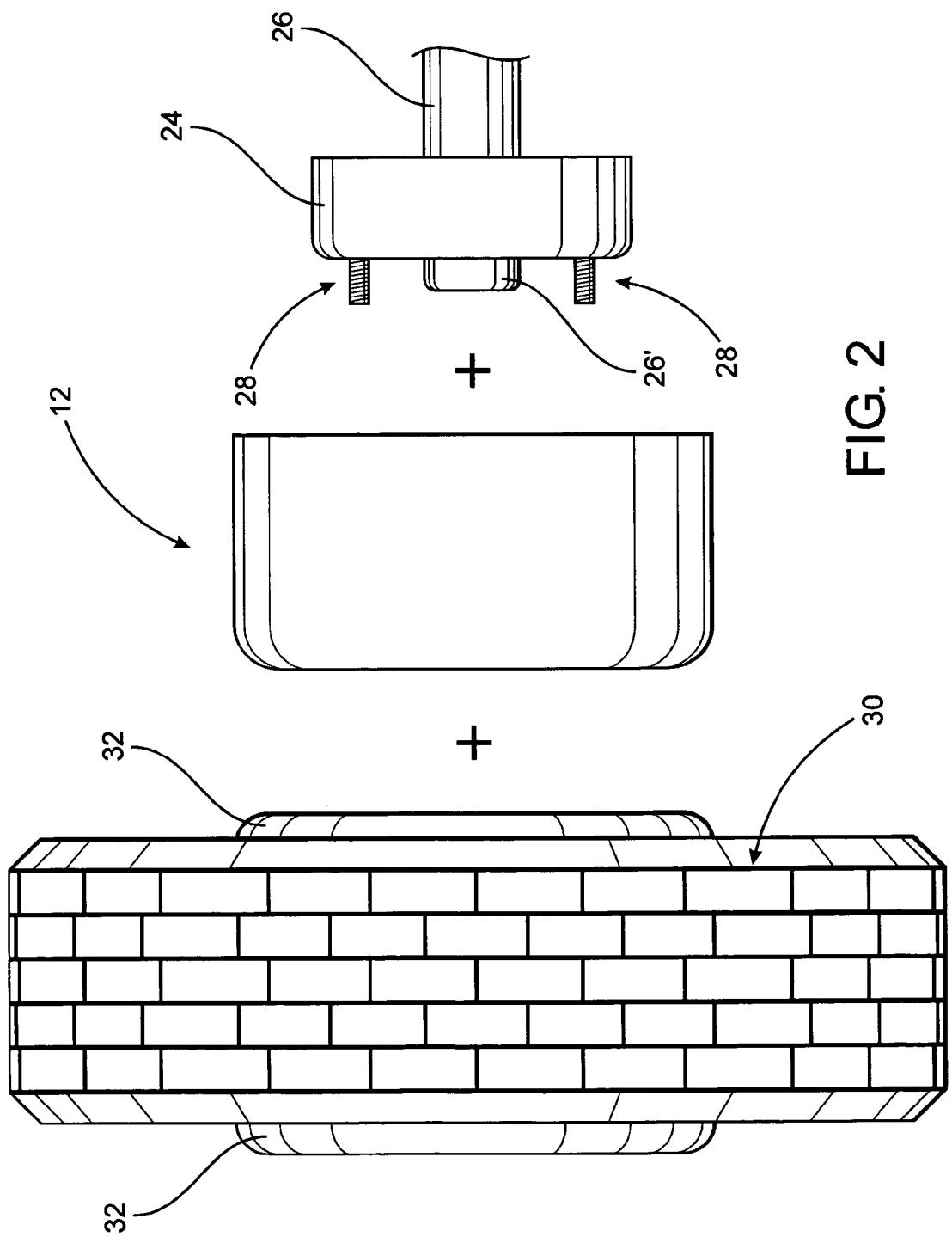
FIG. 2 is an exploded view of the unassembled energy converter of the embodiment of FIG. 1, in partial cutaway.
Figure 4:
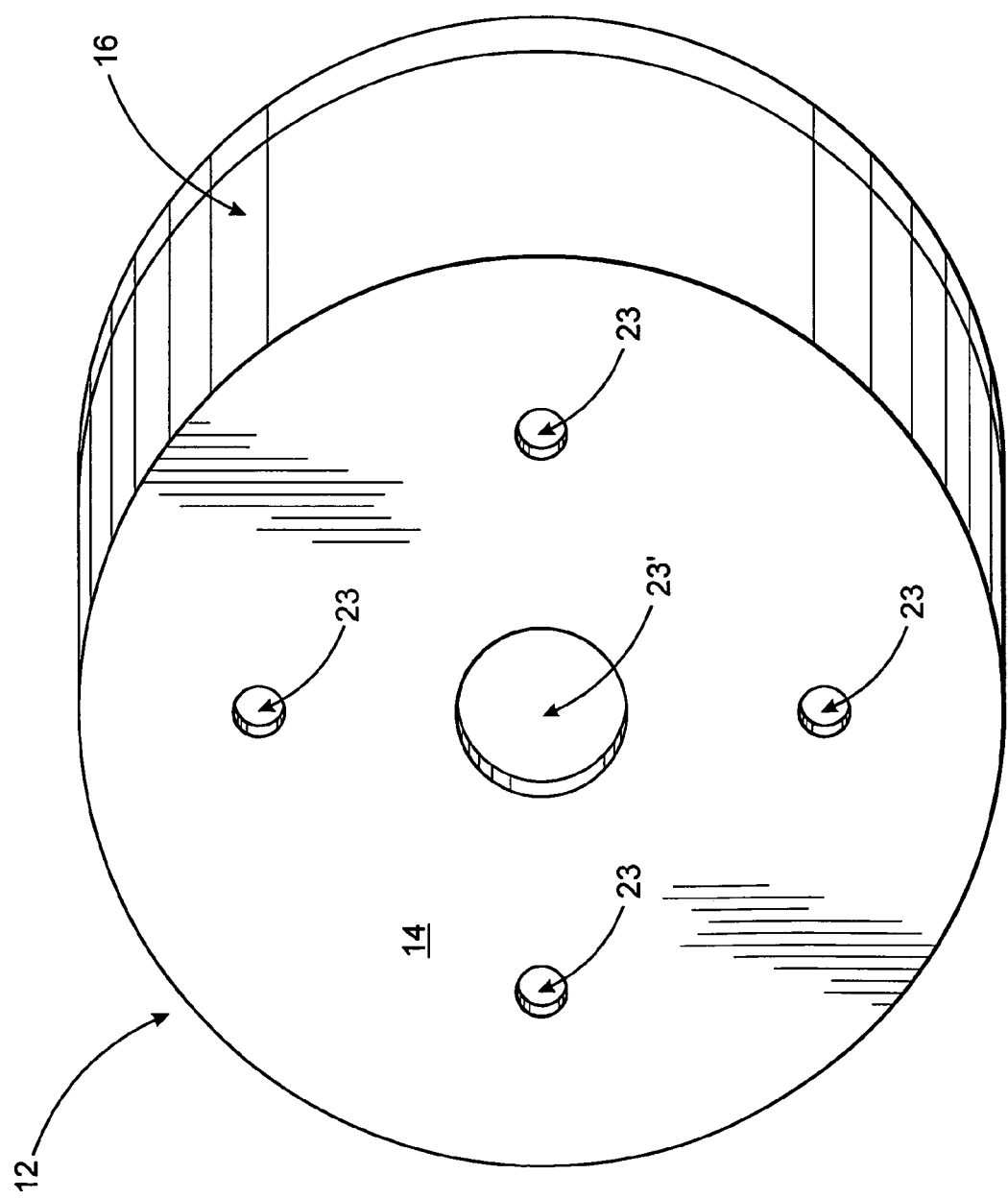
FIG. 4 is an exterior perspective view of an adaptor component operatively associated with the energy converter assembly of the embodiments of FIGS. 1-3.
Figure 5:
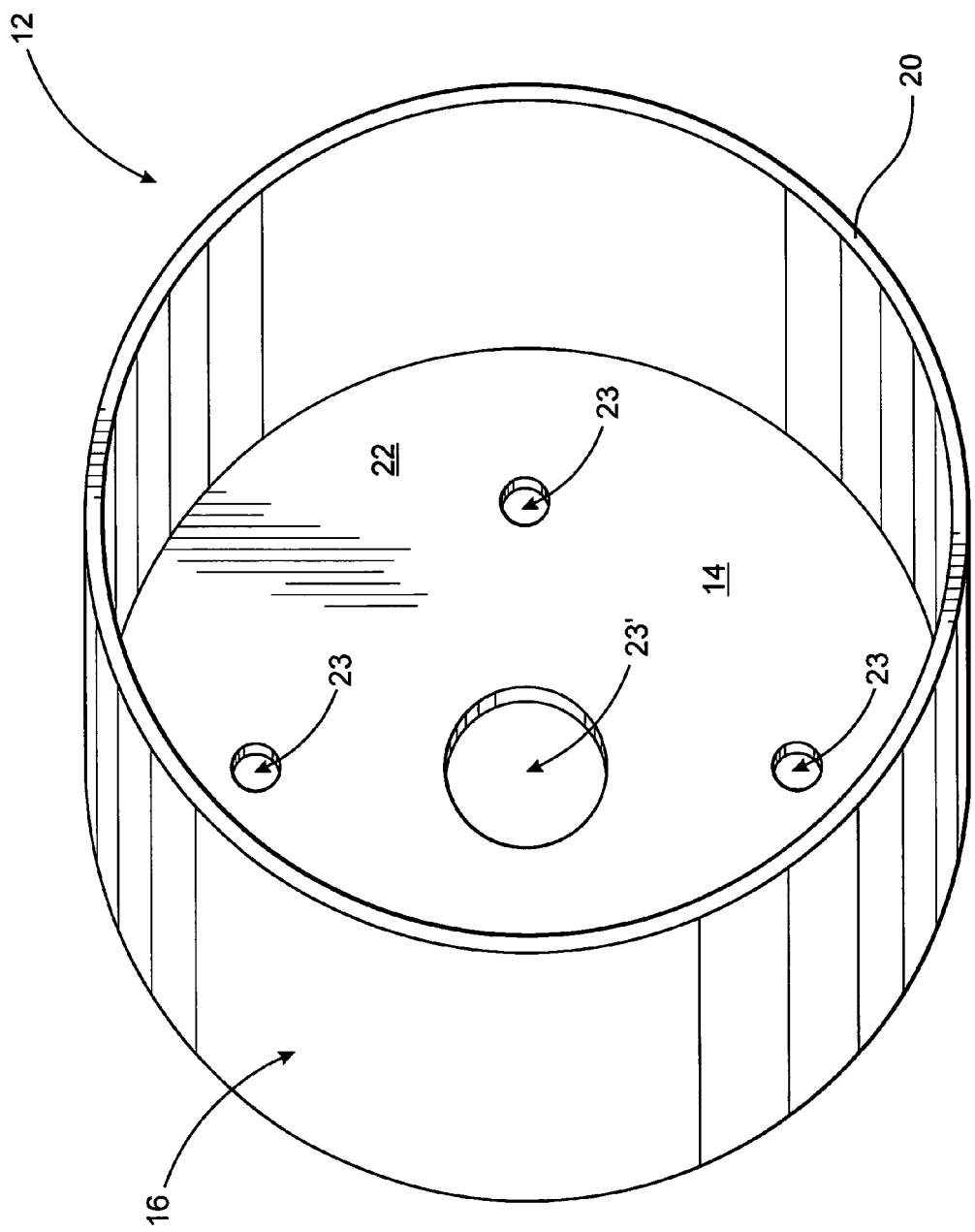
FIG. 5 is an interior perspective view of the embodiment of FIG. 4.

As clearly represented in FIGS. 4 and 5 as associated with FIGS. 1 and 2, the adaptor 12 includes a base 14 and an exterior, preferably cylindrically side wall 16 extending between the base 14 and an open end or access opening 20. Accordingly, the base 14 and the side wall 16 define a hollow interior 22 of the adaptor 12. The hollow interior 22 and the access opening 20 are cooperatively and correspondingly configured to receive the wheel/brake drum portion 24 of a wheel vehicle, as represented in FIG. 2. In conventional fashion, the wheel/brake drum 24 is connected to one end of an axle 26 and is fixedly secured so as to rotate therewith. Moreover, the wheel/brake drum 24 includes a plurality of "lugs" 28 extending outwardly from an end surface thereof. The lugs or like connectors are disposed and structured to secure a tire generally indicated as 30 thereto by passing through the tire rim or hub 32. As such, the plurality of lugs 28 and conventional receiving openings or apertures in the rim or hub 32 of the tire 30 correspond in number and configuration such that the lugs 28 pass through the hub or rim 32 of the connected tire 30 and are secured thereto by appropriate lug nuts, as is well known.

Therefore, the adaptor 12 is dimensioned, configured and structured to facilitate passage of the vehicle wheel/brake drum 24 into the interior 22 thereof. Moreover, the base 14 of the adaptor 12 includes an apertured construction comprising a plurality of apertures 23 which also correspond in number and array to the plurality of lugs 28 and the plurality of receiving openings formed in the rib or hub 32 of the connected tire assembly 30. In addition, the apertured construction of the base 14 may be further defined by a central or appropriately disposed aperture 23' disposed and structured to receive an end portion 26' of the axle 26 as the vehicle wheel/brake drum 24 passes into the interior 22 of the adaptor 12, and as it is connected to the hub or rim 32 of the connected tire assembly 30. It is emphasized that the plurality of receiving apertures 23 formed in the base 14 correspond in number and pattern to the plurality of lugs 28 formed on the vehicle wheel 24, thereby facilitating passage of the lugs through the base 14 into connecting relation to the hub or rim 32 of the connected tire assembly 30.

It should therefore be apparent that upon movement of a wheeled vehicle associated with the axle 26 and vehicle wheel 24, both the connected tire assembly 30 and the adaptor 12 will be forced to concurrently rotate. As further noted, the adaptor 12 is disposed in an operative orientation in sandwiched or other interconnecting relation between the vehicle wheel 24 and the rim or hub 32 of the connected tire assembly 30. As a result, the wheel/drum portion 24 is at least partially enclosed and/or hidden from exterior access. Moreover, the enclosing relation of the adaptor 12 relative to the vehicle wheel/drum 24 is accomplished by the outward extension of the side wall 16 as it surrounds and at least partially defines the hollow interior 22. As clearly represented in FIG. 1, the length or transverse dimension of the side wall 16 provides for the positioning of a "drive portion" 16' of the adaptor 12 in an outwardly, exposed relation to the connected tire assembly 30 and at least partially enclosed vehicle wheel 24. The drive portion 16' can therefore be accurately described as being at least partially defined by the cylindrically configured exterior surface of the side wall 16. So configured, disposed, and structured, the drive portion 16' of the adaptor 12 is in a position to drivingly engage the drive linkage 17, which serves to drivingly interconnect the adaptor 12 to the current generating assembly 14.

Figure 3:
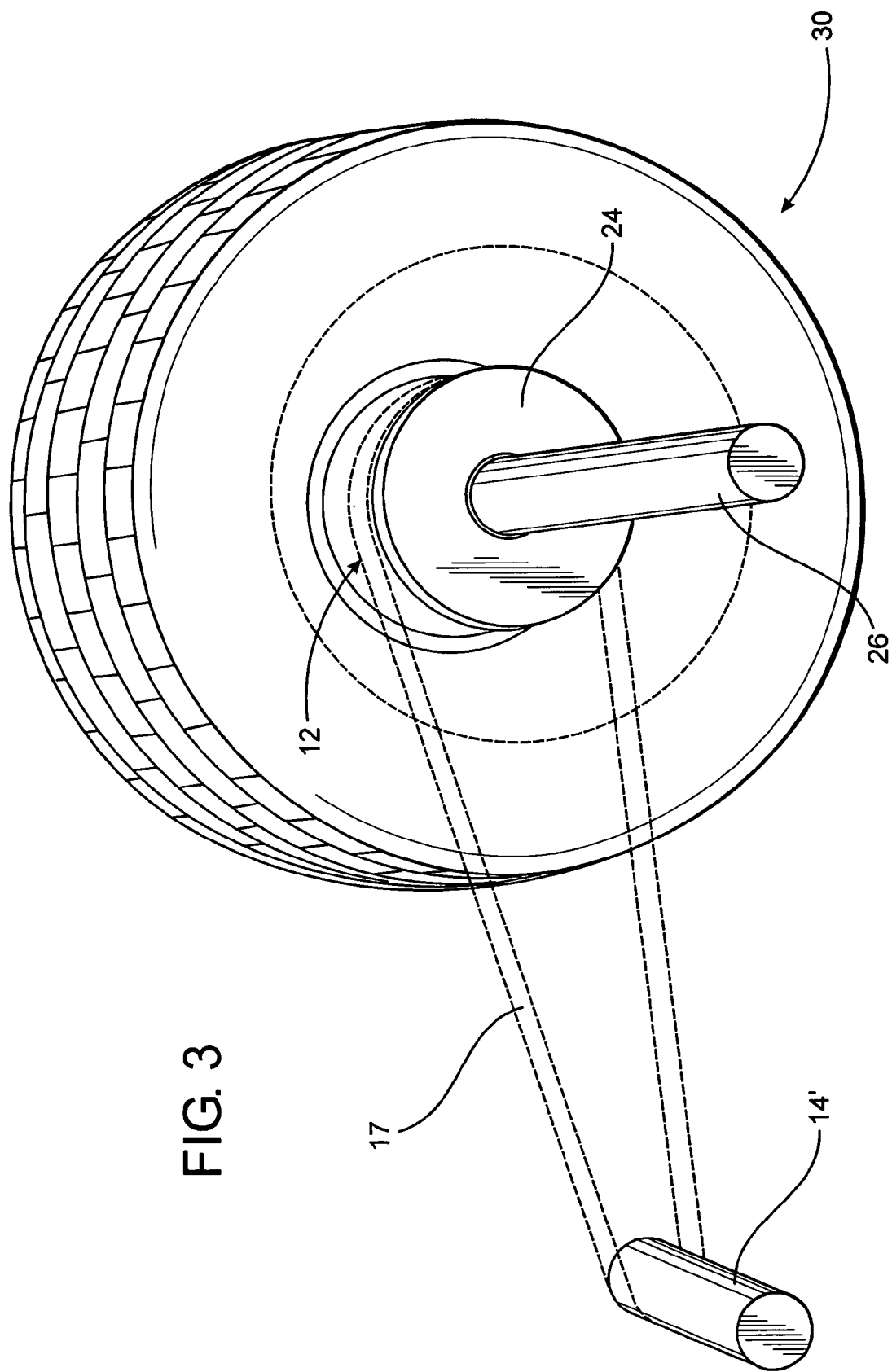
FIG. 3 is a schematic representation of operative positioning of the energy converter assembly, of the embodiments of FIGS. 1 and 2.

In at least one preferred embodiment, such as depicted in FIGS. 1 and 3, the drive linkage 17 comprises at least one drive belt engaging the drive portion 16' which is forced to be driven thereby during movement of the vehicle, and more specifically, during rotation of the axle 26, the vehicle wheel 24, the adaptor 12, and the connecting tire assembly 30. As also represented in FIG. 1, the drive linkage or drive belt 17 is connected in driving relation to the current generating assembly 14 such as by drive shaft 14' or other appropriate component associated with the current generating assembly 14. Moreover, when a drive belt or substantially equivalent drive linkage 17 is used to drivingly interconnect the adaptor 12 to the current generating assembly 14, a linkage orientation assembly generally indicated as 40 is mounted on the frame or other appropriate portion of the vehicle and is adjustably connected to, and operatively engaged with, the drive belt or drive linkage 17. More specifically, the linkage orientation assembly 40 may be in the form of a belt tensioning structure or assembly of the type which includes one or more biasing springs mounted within a housing or casing and disposed in biasing relation to an outwardly extending arm or like structure. The distal end of the arm of the belt tensioning and/or linkage orientation assembly 40 is structured to engage in the drive belt or drive linkage 17. As a result, during travel of the vehicle, the connecting tire assembly 30 will invariably encounter bumps, potholes or other irregular driving surfaces over which the vehicle travels. As a result, shock absorbers and appropriate spring assemblies serve to interconnect the frame to the axle 26. Therefore, linear movement of the connecting tire assembly 30 as a result of bumps, potholes, etc. will cause changes in the distance between the adaptor 12 and the current generating assembly 14. The linkage orientation assembly 40, which may be in the form of the aforementioned belt tensioner, is thereby structured to automatically maintain an appropriate tension between the drive belt or other drive linkage 17 and both the drive portion 16' of the adaptor 12 and the current generating assembly 14, regardless of changes in the distances between the adaptor 12 and the current generating assembly 14.

Figure 6:
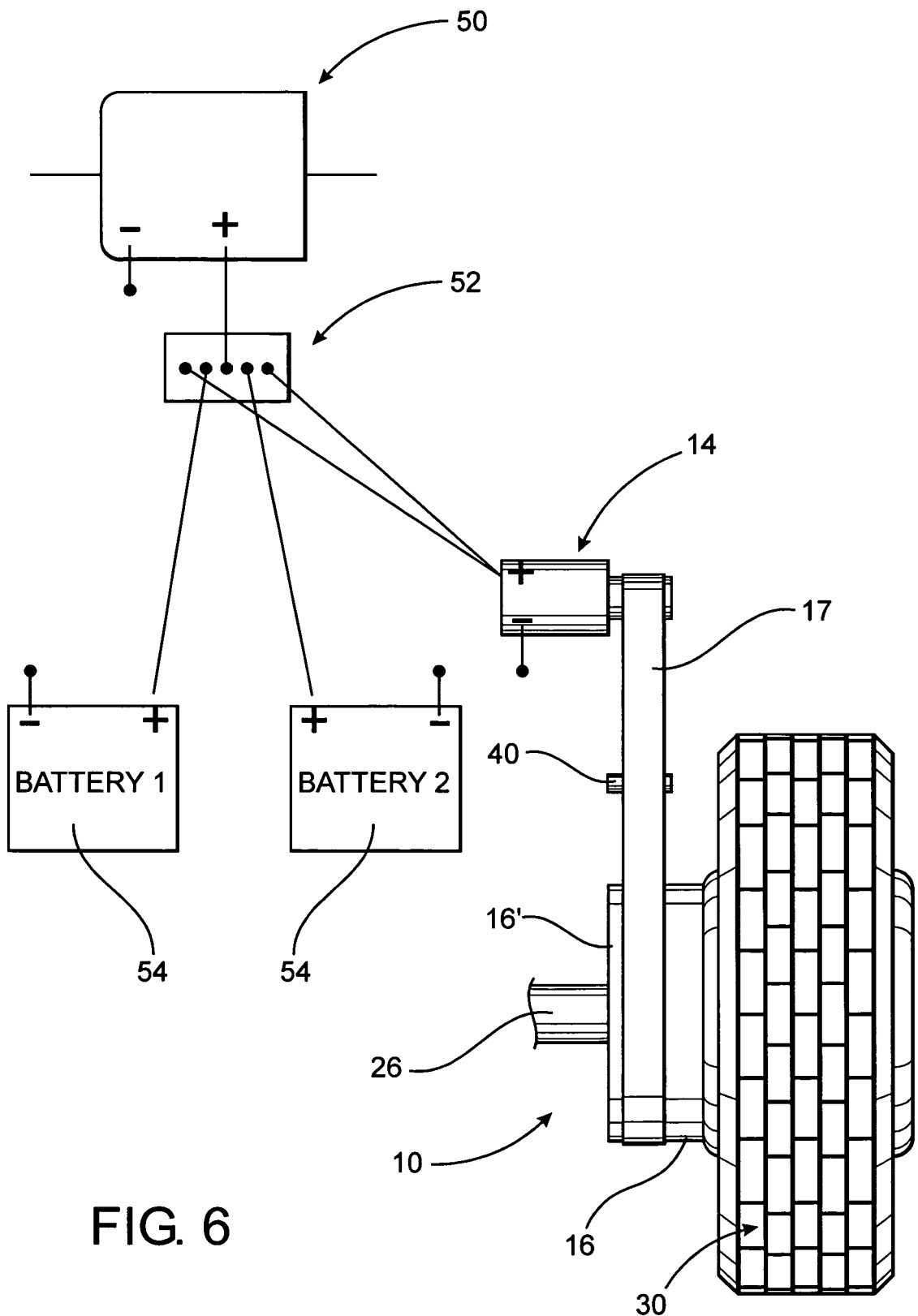
FIG. 6 is a schematic representation of the energy converter assembly of the present invention associated with the control assembly and its use in combination with a motor vehicle at least partially driven by an electrical drive assembly.

In addition to the above, the current generating assembly 14 may assume a variety of different structural and operative features, but is preferably provided in the form of an alternator. As such, the current generating assembly 14 may be an alternator specifically adapted for an automobile or vehicle, and is commonly known in the industry as a vehicle or automobile alternator. However, the structure and operation of the current generating assembly 14 should also be capable of operating, supplying, and/or distributing current to an electrical drive assembly, generally indicated as 50 as in FIG. 6, when the energy convertor assembly 10 is associated with an electrically driven vehicle or hybrid vehicle wherein the powering thereof is at least partially accomplished by an electronic drive assembly 50. Therefore, in the embodiment of FIG. 6, a control assembly generally indicated as includes appropriate electrical circuitry wherein current generated by the current generating assembly 14 may be distributed between one or a plurality of batteries as at 54, serving to supply current to the vehicle and specifically to the electronic drive assembly 50 which serves to at least partially power the vehicle. The control assembly 52 includes appropriate circuitry to accomplish the distribution of current, whether it is generated by the current generating assembly 14 or is derived from the battery assembly 54.

The utility of the energy converter assembly 10 of the present invention is further demonstrated by its ability to be used on or in combination with a variety of different wheeled vehicles, such as automobiles, trucks, etc. Moreover, the energy converter assembly 10, as demonstrated in FIG. 6, can be used on vehicles which are wholly or partially powered by an electrical drive assembly 50 with little or no structural or operative modification.

However, in at least one preferred embodiment, the energy convertor assembly 10 of the present invention is specifically adapted to be mounted on a non-drive train wheel 24, and any battery driven vehicle of the type associated with at least a partially self-sustained charging system. As a result, usage mileage of electric vehicles, hybrid vehicles, and the like will be significantly increased, while concurrently allowing electronic components, including electronic consumer based devices such as cell phones chargers, GPS devices, laptops, etc. to be charged or maintained a charge thereon. Moreover, the energy converter system 10 of the present invention can include a single generator/alternator or multiple such energy generating assemblies 14 so as to create a sufficient electrical charge for the recharging of one or more batteries 54, as well as supply other electrical needs of various electronic components associated with the vehicle. Since the energy convertor assembly 10 of the present invention may also be structured, for the purpose of convenience, to be recharged using household 220 volt or 240 volt outlets for maintenance of the electronic power supply of the electric vehicle, wherein the energy convertor assembly 10 of the present invention eliminates the need for daily charge and reduces the need for gasoline consumption, thereby benefiting the environment.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly structured to convert mechanical energy to electrical energy for a wheeled vehicle, said assembly comprising:
    a current generating assembly connected to a frame of the vehicle,
    an adaptor connected to a vehicle wheel in an operative position and rotatable therewith relative to the vehicle frame,
    said adaptor including a drive portion disposed in an accessible, at least partially exposed orientation relative to said current generating assembly,
    a drive linkage operatively interconnecting said current generating assembly and said adaptor, and
    said adaptor, said drive linkage and said current generating assembly cooperatively disposed and structured to operatively drive said current generating assembly upon rotation of the vehicle wheel, and
    said adaptor structured and disposed for substantially enclosing relation to the vehicle wheel, said adaptor disposed between the vehicle wheel and a tire assembly connected to the vehicle, when said adaptor is in said operative position.

2. An assembly as recited in claim 1 wherein said drive linkage is disposed in driven engagement with said drive portion and in driving connection with said current generating assembly.

3. An assembly as recited in claim 2 wherein said drive linkage comprises a drive belt.

4. An assembly as recited in claim 3 further comprising a linkage orientation assembly including a belt tensioning assembly operatively connected to said drive belt.

5. An assembly as recited in claim 1 further comprising a linkage orientation assembly interconnected between the vehicle frame and said drive linkage and structured to maintain said drive linkage in operative connection with said current generating assembly at least during travel of the vehicle.

6. An assembly as recited in claim 1 wherein said drive portion of said adaptor is disposed exteriorly of the vehicle wheel and in driving engagement with said drive linkage.

7. An assembly as recited in claim 6 wherein said drive linkage comprises a drive belt connected in driven engagement with said drive portion and in driving connection with said current generating assembly.

8. An assembly as recited in claim 7 wherein said operative portion comprises an exterior surface of said adaptor, said exterior surface being disposed and structured to drivingly engage said drive belt.

9. An assembly as recited in claim 1 wherein said adaptor comprises a base and a sidewall collectively disposed to at least partially define a hollow interior of said adaptor, said hollow interior including an access opening.

10. An assembly as recited in claim 9 wherein said base comprises an apertured construction cooperatively structured to interact with a lug structure on the vehicle wheel to facilitate attachment of a tire assembly to the vehicle wheel when said adaptor is in said operative position.

11. An assembly as recited in claim 10 wherein said sidewall is disposed in substantially surrounding relation to the vehicle wheel; said hollow interior and said access opening dimensioned and configured to receive the vehicle wheel within said adaptor, when said adaptor is disposed in said operative position.

12. An assembly as recited in claim 11 wherein said apertured construction comprises a plurality of apertures corresponding in number and position of a plurality of lugs associated with the vehicle wheel.

13. An assembly as recited in claim 1 wherein said current generating assembly comprises a vehicle alternator.

14. An assembly structured to convert mechanical energy to electrical energy for a wheeled vehicle, said assembly comprising:
    a current generating assembly connected to a frame of the vehicle,
    an adaptor connected to and rotatable with a vehicle wheel in an operative position, said operative position comprising said adaptor disposed between and in engaging relation with the vehicle wheel and a tire assembly connected to the vehicle wheel,
    a drive linkage including a drive belt connected in driven relation to said adaptor and in driving relation to said current generating assembly, said adaptor including a drive portion disposed exteriorly of the vehicle wheel and structured to drivingly engage said drive belt when said adaptor is in said operative position, and a linkage orientation assembly connected to the vehicle and structured to maintain said drive belt in a continuous driving relation to said current generating assembly during travel of the vehicle and disposition of said adaptor in said operative position.

15. An assembly as recited in claim 14 wherein said current generating assembly comprises an alternator.

16. An assembly as recited in claim 14 wherein said adaptor comprises a base and a sidewall collectively disposed to at least partially define a hollow interior of said adaptor, said hollow interior including an access opening.

17. An assembly as recited in claim 16 wherein said base comprises an apertured construction cooperatively structured to interact with a lug structure on the vehicle wheel to facilitate attachment of a tire assembly thereto when said adaptor is in said operative position.

18. An assembly as recited in claim 17 wherein said sidewall is disposed in substantially surrounding relation to the vehicle wheel; said hollow interior and said access opening dimensioned and configured to receive the vehicle wheel within said adaptor, when said adaptor is disposed in said operative position.

19. An assembly as recited in claim 18 wherein said apertured construction comprises a plurality of apertures corresponding in number and position to a plurality of lugs associated with the vehicle wheel.

20. An assembly as recited in claim 16 wherein said sidewall comprises an exterior surface having a continuous cylindrical configuration, said exterior surface at least partially defining said drive portion and being disposed and structured to drivingly engage said drive belt.

21. An assembly as recited in claim 14 further comprising a linkage orientation assembly including a belt tensioning structure mounted on the vehicle frame and operatively connected to said drive belt.

* * * * *